Figure 1:
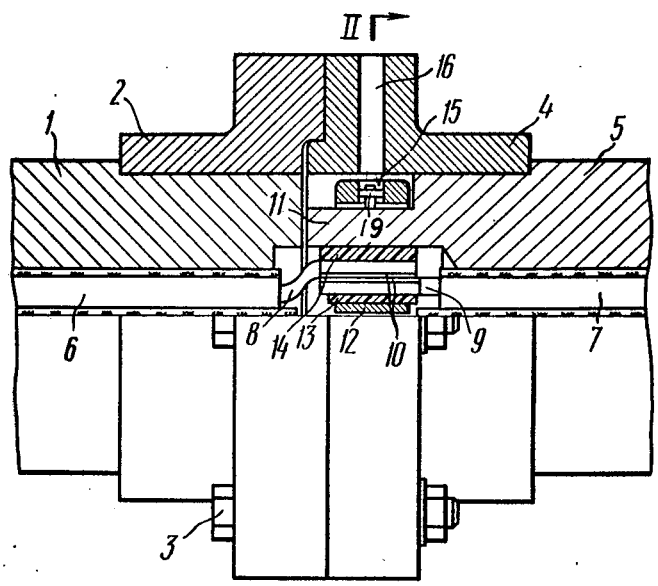

United States Patent [19]

Bogdanov et al.

[11] 4,014,599
[45] Mar. 29, 1977

[54] DEVICE FOR ELECTRICAL COUPLING OF GENERATOR AND EXCITER ROTOR CURRENT LEADS

[76] Inventors: Nikolai Ivanovich Bogdanov, ulitsa 2 Komsomolskaya, 12, kv. 24; Vladimir Stepanovich Vitchenko, Vitebsky prospekt, 29, korpus 2, kv. 142; Gennady Konstantinovich Smirnov, ulitsa Prazhskaya, 20, kv. 132; Vladimir Grigorievich Shalaev, prospekt Novoizmailovsky, 55, kv. 92, all of, Leningrad, U.S.S.R.

[22] Filed: July 11, 1975

[21] Appl. No.: 595,216

[52] U.S. Cl. .............................. 339/5 R; 310/71; 339/272 R
[51] Int. Cl.² ........................................ H01R 39/00
[58] Field of Search ........... 339/5 R, 5 P, 6 R, 8 R, 339/8 PB, 272 R; 310/71

[56] References Cited
UNITED STATES PATENTS

| 2,381,331 | 8/1945 | Ayers | 339/272 UC |
| 2,448,766 | 9/1948 | Burke | 339/272 B |
| 3,452,317 | 6/1969 | Carlson | 339/272 A |
| 3,524,090 | 8/1970 | Sark | 339/71 |
| 3,636,394 | 1/1972 | Forste | 339/8 R |

Primary Examiner—Roy Lake
Assistant Examiner—Mark S. Bicks

[57] ABSTRACT

A device for electrical coupling of generator and exciter rotor current leads, made in the form of flexible busbars located in the area of mechanical coupling between said rotors, characterized, according to the invention, in that the end face of the shaft of one rotor is provided with a projection under which said flexible busbars forming an overlapping joint are placed parallel to the shaft axis, said busbars being attached to said projection by means of a clamp embracing said busbars and projection in the cross-sectional plane of the shaft.

2 Claims, 2 Drawing Figures

DEVICE FOR ELECTRICAL COUPLING OF GENERATOR AND EXCITER ROTOR CURRENT LEADS

The present invention relates to electric machines, and more particularly, to devices used for electrical coupling of generator and exciter rotor current leads.

Known in the art are devices, wherein the coupling between the generator rotor current lead and the exciter rotor current lead is effected by means of spring-loaded contacts, the contact surfaces whereof are located in a plane normal to the shaft axis.

A disadvantage inherent in the foregoing devices resides in a limited area of contact surfaces and in excessive number of parts. Besides, the use of springs only to produce a contact pressure does not provide for high security of contact joint at heavy generator field currents (of the order of 8,000 A in a turbine generator rated at 1,200 MW) under conditions of heavy vibration at the shaft ends.

There is also known a device for electrical coupling of the generator and exciter rotor current leads, made in the form of busbars located in the area of the half-couplings, arranged in a radial manner and attached with bolts seated in through holes made in the half-coupling flanges.

A disadvantage of the above-mentioned device employed for transmission of high currents resides in the following.

As has been mentioned above, the electrically coupled surfaces are located in the area of the half-coupling flanges, whereby the flange area originally intended to transmit the torques is reduced, while at heavy currents the area of the electrically coupled surfaces must be large, so that the dimensions of the flange must be increased. In addition, the current lead assembly and insulation are complicated to a considerable extent because solid current-carrying busbars bent at normal angles to the axis of rotation of the electric machine are acted upon by heavy centrifugal loads produced during rotation of the shaft.

There is known on electromechanical coupling device intended primarily for use in electric machines, wherein the current leads are coupled electrically through plug contacts.

Said device is disadvantageous in that it has an excessive number of contact joints.

There is likewise known in the art a device for coupling generator and exciter rotor current leads, made in the form of busbars located in the area of the half-couplings, arranged radially and having a tapered shape, with an elastic current-carrying wedge member inserted between said busbars.

The above-mentioned device suffers from a disadvantage residing in that respective mating surfaces of the busbars and wedge member require accurate machining, and heavy additional loads are applied to the bolts used to attach the half-couplings and to transmit the torque, with the result that the bolts must be fabricated from a material possessing high mechanical properties.

The present invention is therefore aimed at providing a device for electrical coupling of exciter and generator rotor current leads, of simple construction and high reliability ensured by increasing the pressing force exerted on the contact surfaces, with the current being distributed uniformly over the entire contacts area.

This object is attained in a device for electrical coupling of generator and exciter rotor current leads, made in the form of flexible busbars located in the area of mechanical coupling of the shafts, characterized, according to the invention, in that the end face of one shaft is provided with a projection under which the busbars forming an overlapping joint are placed parallel to the shaft axis, and are attached to said projection by means of a clamp embracing said busbars and projection in the cross-sectional plane of the shaft, whereby the pressure resulting from the centrifugal forces acting on the clamp and on the busbars proper is evenly distributed over the entire contact area and is directed normally thereto. The clamp is insulated from the busbars, and the busbars are insulated from the shaft by means of insulation gaskets.

Figure 2:
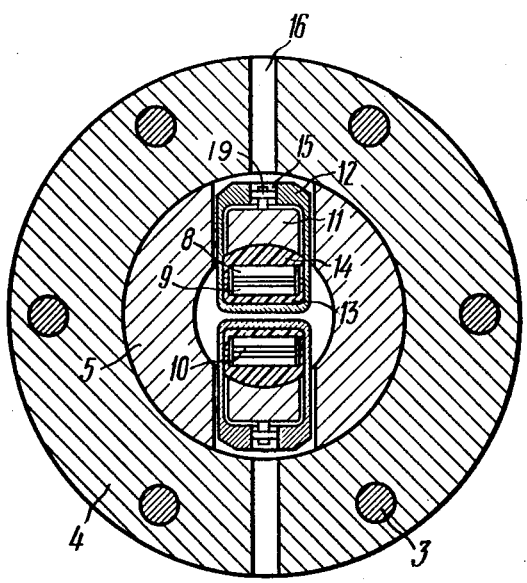

The invention will now be described in greater detail with reference to a preferred embodiment thereof taken in conjunction with, and as shown in the accompanying drawings, wherein FIG. 1 is a longitudinal section view of a device for electrical coupling of generator and exciter rotor current leads, according to the invention;

FIG. 2 is a sectional view taken along line II—II of FIG. 1, according to the invention.

Referring now to FIG. 1, a shaft 1 of a generator carries a half-coupling 2 linked with bolts 3 to half-coupling 4 mounted on a shaft 5 of an exciter. An axial hole in the shafts 1 and 5 accommodates a current-carrying pin 6 connected to a generator field winding, and a current-carrying pin 7, connected to an exciter rectifier (not shown in the drawing). Attached to the current-carrying pins 6 and 7 in the area of the joint of the shafts 1 and 5 (FIGS. 1 and 2) are busbars 8 and 9 assembled of copper sheets (0.3 to 0.5 mm thick) for elasticity, and provided with silver-plated liners 10 constituting the contact surfaces. In the area of electrical contact between the busbar 8 and busbar 9, the pile of sheets and liner 10 in each busbar is resistance-welded in vacuo for integrity. The busbar 8 overlaps the busbar 9 in parallel with the axis of the shafts 1 and 5. In order to press the busbar 9, in a radial direction, against the busbar 8 under the action of the centrifugal forces of the busbar 8 due to rotation; a projection 11 is made on the end of the shaft 5. To manufacture the projection, a cylindrical bore is made in the shaft body along the shaft axis so that a space is formed to accommodate the flexible busbars 8 and 9. After that, grooves are milled to fit a clamp 12 seated on the resulting projection 11.

To produce a high contact pressure, the busbars 8 and 9, and the thrust projection 11 are embraced by the clamp 12 in the cross-sectional plane of the shafts 1 and 5, with the heavier portion of said clamp located at a longer radius from the center of rotation.

The clamp 12 is insulated from the busbars 8 and 9, and said busbars are insulated from the thrust projection 11 on the shaft 5, by means of gaskets 13 and 14, respectively. The gaskets 13 and 14 are made of glass-base textolite. To attach the clamp 12 and the busbars 8 and 9 to the projection 11, and to produce an initial contact force prior to starting of the machine, a threaded hole 15 is made in the clamp 12 and a smooth hole 16 is made in the half-coupling 4, wherein a fastener 19 is installed, with said being holes axially aligned. The primary contact force is exerted when the machine is running.

After the machine has been started, the busbar 9 as well as the clamp 12 joined thereto is acted upon by centrifugal forces and exerts a pressure in a radial direction on the busbar 8, thrusting against the projection 11 through the insulation gaskets 13 and 14. During operation of the machine, the contact pressure is applied equally to the whole contact area and is directed normally thereto, while the clamp 12 furnished with the heavy portion provides for a sufficiently high contact pressure between the busbars to conduct a field current of 8000 A and more with a given contact area. In this case, even heavy vibration at the ends of the shafts does not materially affect the operation of the device.

What is claimed is:

1. A device for electrical coupling of generator and exciter rotor current leads comprising flexible busbars located in the area of mechanical coupling between said rotor current leads, a shaft with end face having a projection under which said flexible busbars form an overlapping joint, said busbars being placed parallel to the axis of said shaft, a clamp embracing said busbars, said busbars being attached to said shaft by means of said clamp embracing said busbars, said clamp embracing said busbars and projection in a cross-sectional plane of the shaft.

2. A device as claimed in claim 1, including a fastener, said clamp having a hole accommodating said fastener for fixing said flexible busbars and clamp in position in relation to said projection.

* * * * *